(12) United States Patent
Mendelsohn

(10) Patent No.: US 7,293,897 B2
(45) Date of Patent: Nov. 13, 2007

(54) INTEGRATED FLUORESCENT LAMP DEVICE

(76) Inventor: Fred Mendelsohn, 1214 W. Cass St., Tampa, FL (US) 33606

( * ) Notice: Subject to any disclaimer, the term of this patent is extended or adjusted under 35 U.S.C. 154(b) by 0 days.

(21) Appl. No.: 11/377,837

(22) Filed: Mar. 16, 2006

(65) Prior Publication Data

US 2006/0220596 A1  Oct. 5, 2006

Related U.S. Application Data

(60) Provisional application No. 60/667,221, filed on Apr. 1, 2005.

(51) Int. Cl.
*F21V 23/02* (2006.01)

(52) U.S. Cl. ............... 362/260; 362/265; 362/240; 362/251; 362/640; 362/646; 315/72; 315/209 R; 315/DIG. 5

(58) Field of Classification Search ............... 362/216, 362/224, 240, 251, 260, 265, 294, 640, 546, 362/650, 646; 315/56, 58, 61, 72, 209 R, 315/291, 244, DIG. 5, DIG. 7; 439/226, 439/56, 617

See application file for complete search history.

(56) References Cited

U.S. PATENT DOCUMENTS 2,631,225 A * 3/1953 Gadomski ............... 362/224
4,694,215 A * 9/1987 Hofmann ............... 313/44
5,341,068 A * 8/1994 Nerone ............... 315/219
5,595,438 A * 1/1997 Burd ............... 362/228
5,691,603 A * 11/1997 Nilssen ............... 315/209 R
5,691,606 A * 11/1997 Moisin et al. ............... 315/307
6,162,096 A * 12/2000 Klaus ............... 439/617
6,984,926 B2 * 1/2006 Tsuneto et al. ............... 313/46
7,021,985 B2 * 4/2006 Itaya et al. ............... 445/26
7,053,555 B2 * 5/2006 Fujiwara et al. ............... 313/635

* cited by examiner

*Primary Examiner*—Haissa Philogene
(74) *Attorney, Agent, or Firm*—Arthur W. Fisher, III

(57) ABSTRACT

An integrated fluorescent lamp device for use with a lamp fixture including a lamp socket configured to removably receive a portion of the integrated fluorescent lamp device therein to selectively support the integrated fluorescent lamp device thereon, the integrated fluorescent device comprises an enclosure to house an electronic ballast coupled to a lamp base affixed to the enclosure having a pair of mounting members formed on opposite sides thereof configured to be removably received in the lamp socket obversely configured to secure the integrated fluorescent lamp device to the lamp fixture and a fluorescent lamp affixed to the enclosure including a spiral shaped glass tube containing a gas electrically coupled to the electronic ballast such that when a switch mounted on the lamp fixture is in the on position electricity flows from an AC power source through the lamp base, electronic ballast and fluorescent lamp to energize the gas within the spiral shaped glass tube.

18 Claims, 4 Drawing Sheets

INTEGRATED FLUORESCENT LAMP DEVICE

CROSS REFERENCE

This is a non-provisional application of provisional application, Ser. No. 60/667,221, filed Apr. 1, 2005.

BACKGROUND OF THE INVENTION

1. Field of the Invention

An integrated fluorescent lamp device for use with a lamp fixture including a lamp socket configured to removably receive a portion of the integrated fluorescent lamp device therein to selectively support the integrated fluorescent lamp device thereon.

2. Description of the Prior Art

U.S. Pat. No. 6,162,096 relates to a ceiling mounted lighting fixture comprising a socket assembly recessed in a ceiling and a reflector mounted to the socket assembly. The socket assembly includes a base and a cover which cooperate to define a chamber having a bottom surface. The receptacle includes a chamber to receive a bulb base and at least two pin holes sized and shaped to receive bulb pins. The pin holes extend through the receptacle and socket base bottom surface so that when the bulb is inserted in the receptacle the bulb pins will be in electrical contact with the circuit board.

U.S. Pat. No. 4,694,215 describes a compact, single-ended fluorescent lamp including two vertically arranged openings to provide for passage of cooling air by thermal convection past a cooling tube.

U.S. Pat. No. 5,691,603 shows a fluorescent lighting system comprising a central power supply including a parallel-resonant self-oscillating bridge inverter to provide output voltage, a tank-inductor and a tank-capacitor parallel-connected across the primary output terminals and plural pairs of secondary output terminals each connected with the primary output terminals. The fluorescent lighting system further includes an on/off switch.

U.S. Pat. No. 5,691,606 describes a ballast circuit for use with a compact fluorescent lamp including an EMI filter, a rectifier and voltage amplification stage, an active resonant circuit and power factor correction stage connected in parallel to a lamp load. The ballast circuit further comprising a second input and second output electrically coupled to an input and an output of the lamp.

Additional examples of the prior art are shown in U.S. Pat. Nos. 7053,555; 7,021,985; 6,984,926; 5,341068; 5,595,438; and 2,631,225.

SUMMARY OF THE INVENTION

The present invention relates to an integrated fluorescent lamp device for use with a lamp fixture comprising an enclosure to house an electronic ballast and fluorescent lamp coupled to a lamp base configured to be removably received in the lamp socket to secure the integrated fluorescent lamp device to the lamp fixture.

The electronic ballast comprises a power supply and inverter circuit disposed on a printed circuit board affixed to the interior of the enclosure.

A first electronic ballast input and a first electronic ballast output of the electronic ballast are electrically coupled to a lamp base input pin and a lamp base output by a lamp base input conductor a lamp base output conductor respectively.

A second electronic ballast input and a second electronic ballast output of the electronic ballast are electrically coupled to a lamp input and a lamp output respectively.

So configured, the switch is selectively movable between an on position and an off position such that when the switch is to the on position to complete the circuit allowing electricity to flow from an AC power source through the electronic ballast to the fluorescent lamp to energize the gas of the fluorescent tube.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which:

FIG. 2A is a top view of the lamp socket for use with the integrated fluorescent lamp of the present invention.

Similar reference characters refer to similar parts throughout the several views of the drawings.

DETAILED DESCRIPTION OF THE PREFERRED EMBODIMENT

Figure 1:
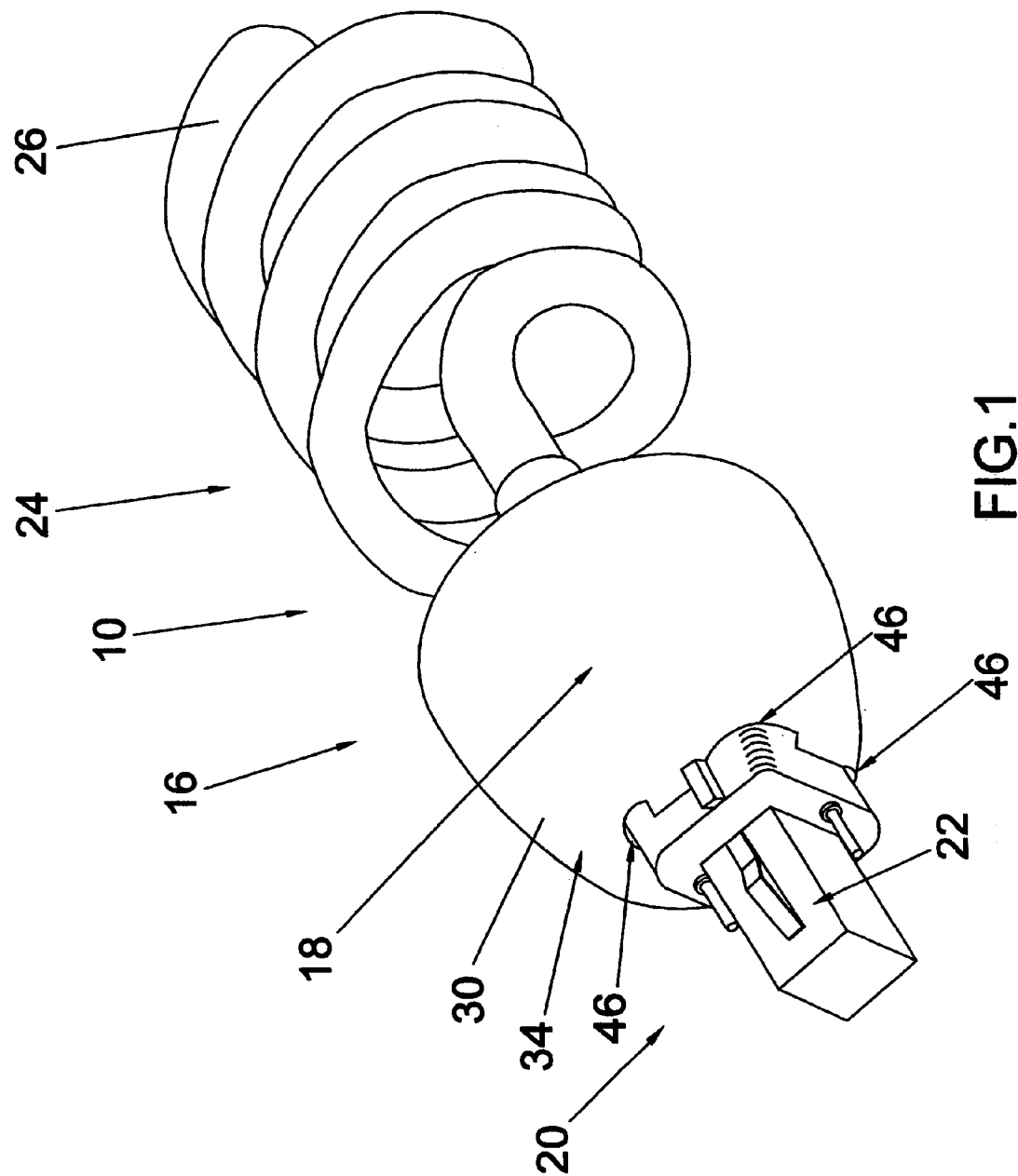
FIG. 1 is a perspective view of the integrated fluorescent lamp device of the present invention.
Figure 2:
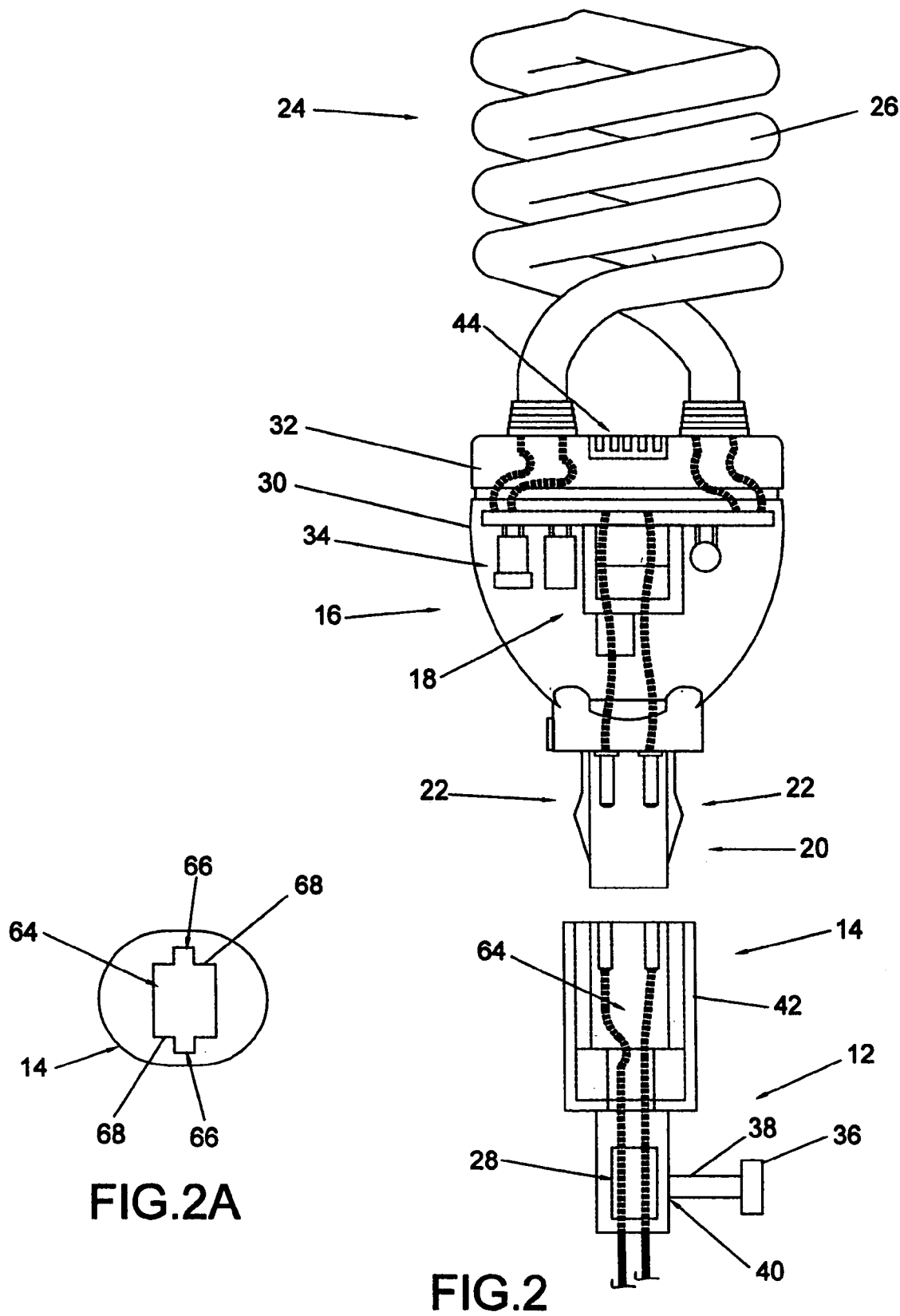
FIG. 2 is a front view of the integrated fluorescent lamp device of the present invention in combination with a lamp fixture.
Figure 3:
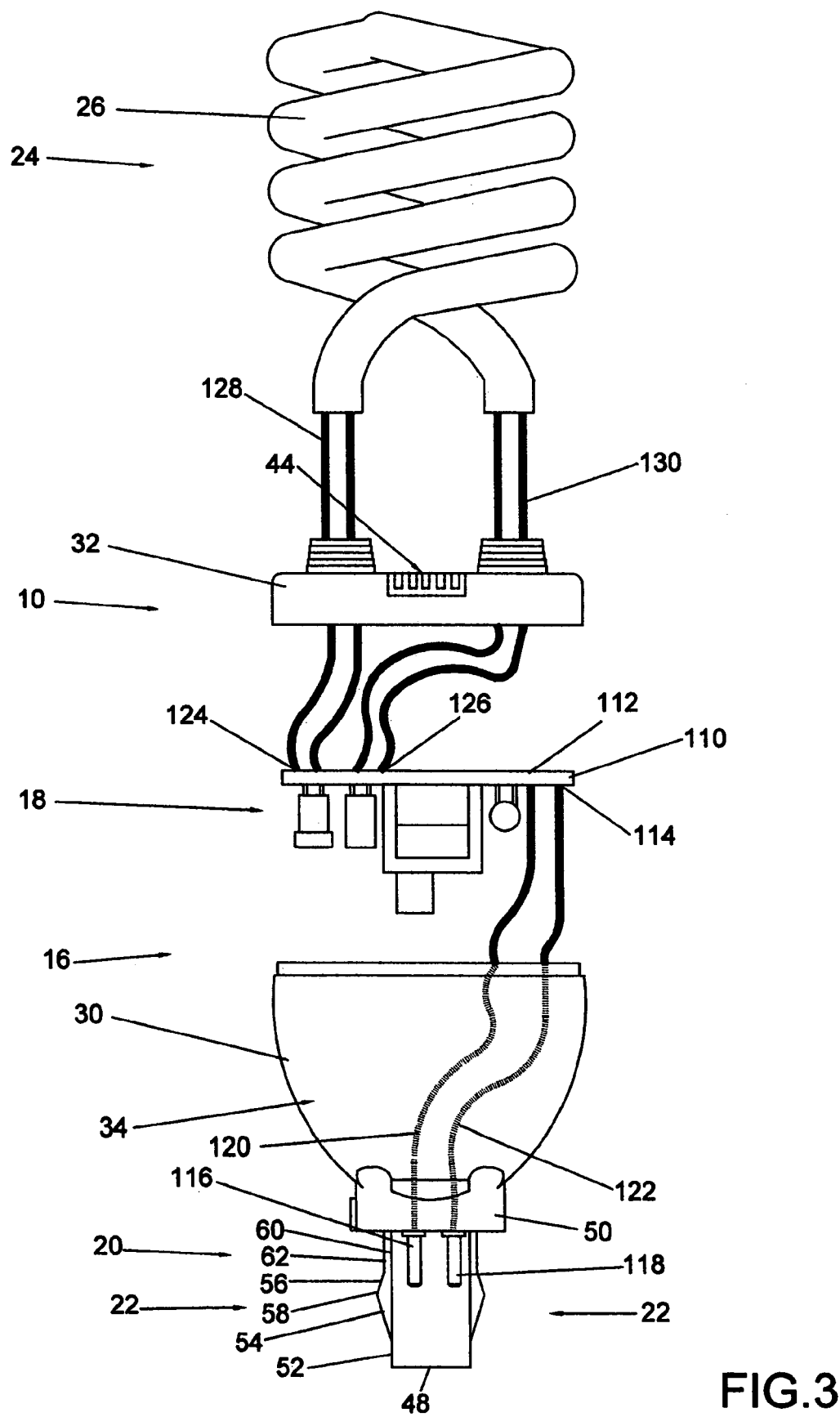
FIG. 3 is an exploded front view of the integrated fluorescent lamp device of the present invention.

As shown in FIGS. 1 through 3, the present invention relates to an integrated fluorescent lamp device generally indicated as 10 for use with a lamp fixture generally indicated as 12 including a lamp socket generally indicated as 14 configured to removably receive a portion of the integrated fluorescent lamp device 10 therein to selectively support the integrated fluorescent lamp device thereon.

As shown in FIGS. 1 through 3, the integrated fluorescent lamp device 10 comprises an enclosure generally indicated as 16 to house an electronic ballast generally indicated as 18 coupled to a lamp base generally indicated as 20 affixed to the enclosure 16 having a pair of mounting members each indicated as 22 formed on opposite sides thereof configured to be removably received in the lamp socket 14 obversely configured to secure the integrated fluorescent lamp device 10 to the lamp fixture 12 and a fluorescent lamp generally indicated as 24 affixed to the enclosure 16 including a spiral shaped glass tube 26. A lamp control device generally indicated as 28 is mounted on the lamp fixture 12 to selectively turn the fluorescent lamp 24 on and off.

The enclosure 16 comprises a hollow bulbous lower shell 30 and an upper cap or cover 32 that when secured together cooperatively form a cavity 34 to receive and support the electronic ballast 18 therein. A plurality of upper vent openings each indicated as 44 are formed through the upper cap or cover 32; while, a plurality of lower vent openings each indicated as 46 are formed through the hollow bulbous lower shell 30 to allow heat generated by the electronic ballast to diffuse or escape from the cavity.

The lamp base 20 comprises a centrally disposed substantially rectilinear base member 48 coupled to the enclosure 16 by a coupling member 50 attached to the hollow bulbous lower shell 30. The mounting members 22 extending outwardly from opposite substantially flat side surfaces 52 of the centrally disposed substantially rectilinear base member 48 comprise a key including a first or lower inclined cam surface 54 and a second or upper inclined cam surface 56 that intersect to cooperatively form an apex 58 in combination with a key element 60 having a substantially flat surface 62 substantially parallel to be the substantially flat side surface 52 of the centrally disposed substantially rectilinear base member 48.

As shown in FIG. 2, the lamp socket 14 of the lamp fixture 12 is obversely shaped or configured with respect to the mounting member 22. Specifically, the lamp socket 14 comprises a centrally disposed substantially rectilinear cavity 64 having a key-way 66 formed on opposite side walls 68 of the centrally disposed substantially rectilinear cavity 64 to receive the centrally disposed substantially rectilinear base member 48 and a corresponding mounting member 22.

The electronic ballast 18 comprises a power supply and inverter circuit disposed on a printed circuit board 110 (FIG. 3) affixed to the interior of the cavity 34 of the enclosure 16.

Figure 4:
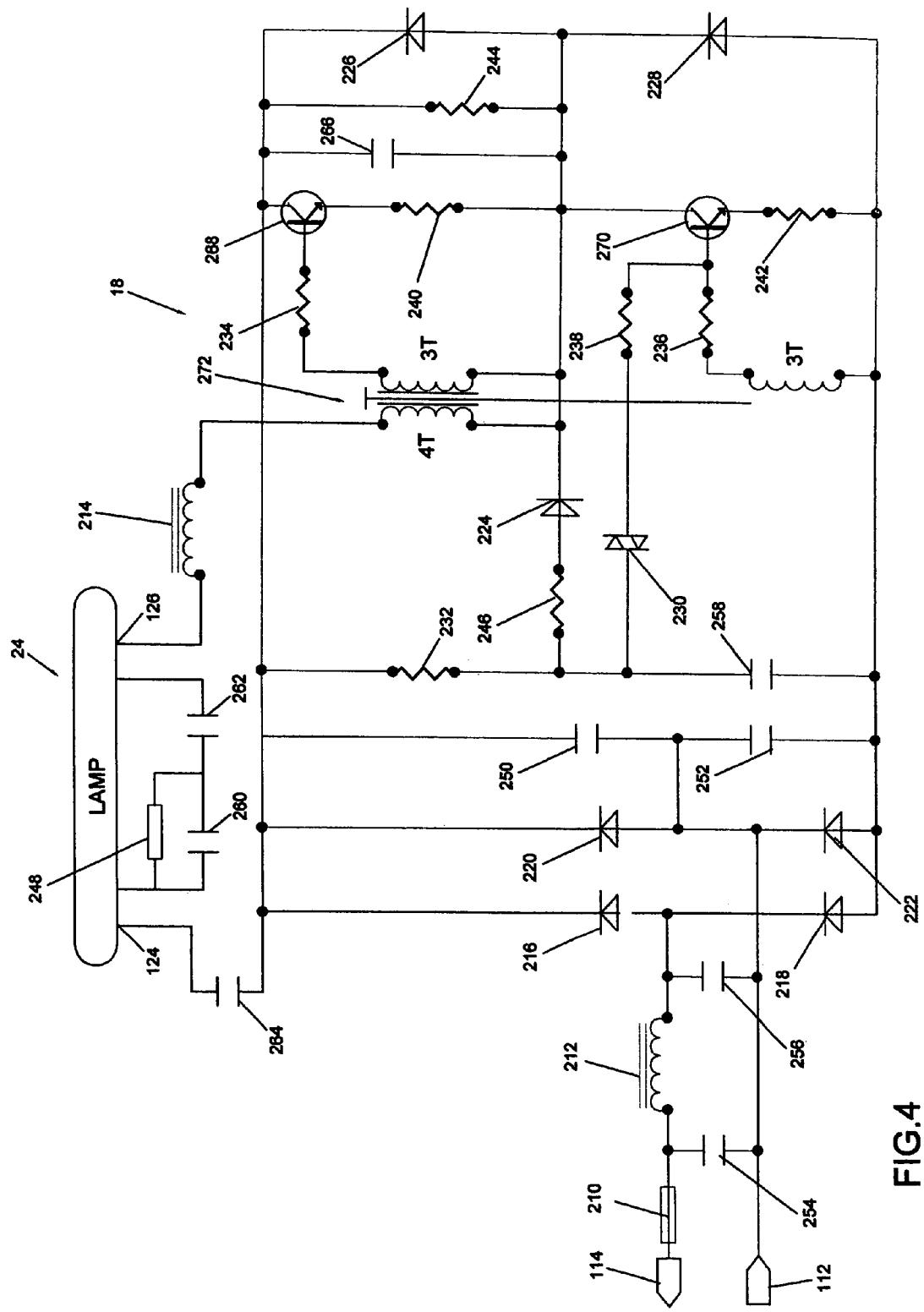
FIG. 4 is a schematic or circuit diagram of the electronic ballast of the present invention.

As shown in FIGS. 3 and 4, a first electronic ballast input 112 and a first electronic ballast output 114 of the electronic ballast 18 are electrically coupled to a lamp base input pin 116 and a lamp base output 118 by a lamp base input conductor 120 a lamp base output conductor 122 respectively. A second electronic ballast input 124 and a second electronic ballast output 126 of the electronic ballast 18 are electrically coupled to a lamp input 128 and a lamp output 130 respectively.

As shown in FIG. 4, the electronic ballast 18 includes a fuse 210 connected in series to the ungrounded lead 114, input and output inductors 212 and 214 respectively, diodes 216 and 218, diodes 220 and 222, diodes 224, 226 and 228, diode 230, resistor 232, resistors 234, 236, 238, 240, 242 and 244, resistor 246, PTC resistor 248, capacitors 250 and 252, capacitors 254 and 256, capacitor 258, capacitors 260 and 262, power capacitor 264, capacitor 266, transistors 268 and 270, and a three coil transformer 272 comprising 3/4/3 turns.

So configured and rated, the input voltage is at least about 120 volts. The input current is at least about 290 mA, between about 290 mA and 340 mA, and the lamp wattage is at least about 10 watts to about 30 watts.

As previously described, the switch 28 is selectively movable between an on position and an off position such that when the switch 28 is to the on position to complete the circuit allowing electricity to flow from an AC power source (not shown) through the electronic ballast 18 to the fluorescent lamp 24 to energize the gas within the spiral shaped glass tube 26.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An integrated fluorescent lamp device for use with a separate lamp fixture including a lamp socket configured to removably receive a portion of said integrated fluorescent lamp device therein to selectively support said integrated fluorescent lamp device thereon, said integrated fluorescent lamp device comprises an enclosure to house an electronic ballast therein having a lamp base affixed to one end portion thereof and a fluorescent lamp affixed to an opposite end portion thereof, said enclosure having at least one mounting member formed thereon configured to be removably received in the lamp socket of the lamp fixture obversely configured to secure said integrated fluorescent lamp device to the lamp fixture and said fluorescent lamp includes a tube containing a gas electrically coupled to said electronic ballast wherein said electronic ballast comprises a first electronic ballast input and a first electronic ballast output mounted on said electronic ballast affixed to a lamp base input and a lamp base output attached to said lamp base by a lamp base input conductor and a lamp base output conductor respectively to selectively feed electricity therebetween, said electronic ballast further comprises a second electronic ballast input and a second electronic ballast output mounted on said electronic ballast affixed to a lamp input and a lamp output coupled to said tube of said fluorescent lamp to selectively feed electricity therebetween such that when a switch mounted on the lamp fixture is in an on position electricity flows from an AC power source through said lamp base, said electronic ballast and said fluorescent lamp to energize said gas within said tube, said electronic ballast disposed within said enclosure, said fluorescent lamp and said lamp base cooperatively forming said integrated fluorescent lamp selectively separable from the lamp socket of the lamp fixture whereby said electronic ballast and said fluorescent lamp are mechanically affixed to each and separable from the lamp socket of the lamp fixture.

2. The integrated fluorescent lamp device of claim 1 wherein said enclosure comprises a hollow bulbous lower shell and an upper cap to cooperatively form a cavity to receive and support said electronic ballast therein.

3. The integrated fluorescent lamp device of claim 2 wherein at least one upper vent opening is formed through said upper cap to allow heat generated by the electronic ballast to diffuse or escape from said cavity.

4. The integrated fluorescent lamp device of claim 3 wherein at least one lower vent opening is formed through said hollow bulbous lower shell to allow heat generated by the electronic ballast to diffuse or escape from said cavity.

5. The integrated fluorescent lamp device of claim 2 wherein at least one lower vent opening is formed through said hollow bulbous lower shell to allow heat generated by the electronic ballast to diffuse or escape from the cavity.

6. The integrated fluorescent lamp device of claim 2 wherein a plurality of upper vent openings are formed through said upper cap and a plurality of lower vent openings are formed through said lower shell to allow heat generated by the electric ballast to diffuse or escape from said cavity.

7. The integrated fluorescent lamp device of claim 1 wherein said lamp base comprises a centrally disposed base member coupled to said enclosure by a mounting member attached to said hollow bulbous lower shell.

8. The integrated fluorescent lamp device of claim 7 wherein said mounting member extends outwardly from said base member.

9. The integrated fluorescent lamp device of claim 8 wherein said mounting member comprises a key including a first inclined cam surface.

10. The integrated fluorescent lamp device of claim 9 wherein said key further includes a second inclined cam surface that intersects said first inclined cam surface.

11. The integrated fluorescent lamp device of claim 7 including a pair of mounting members extending outwardly from said base member, each mounting member comprising a first inclined cam surface and a second inclined cam surface.

12. The integrated fluorescent lamp device of claim 1 wherein the lamp socket of the lamp fixture is obversely shaped or configured with respect to said mounting member.

13. The integrated fluorescent lamp device of claim 1 wherein the lamp socket comprises a centrally disposed rectilinear cavity having a key-way formed on opposite side walls of the centrally disposed rectilinear cavity to receive a centrally disposed rectilinear base member and a corresponding mounting member.

14. The integrated fluorescent lamp device of claim 1 wherein said electronic ballast comprises a power supply and inverter circuit disposed on a printed circuit board affixed to the interior of said cavity of said enclosure.

15. The integrated fluorescent lamp device of claim 1 wherein said enclosure comprises a hollow bulbous lower shell and an upper cap to cooperatively form a cavity to receive and support said electronic ballast therein, an upper vent opening is formed therethrough to allow heat generated by the electronic ballast to diffuse or escape from said cavity and a lower vent opening formed through said hollow bulbous lower shell to allow heat generated by the electronic ballast to diffuse or escape from said cavity and wherein said lamp base further comprises a centrally disposed base member coupled to said enclosure by a coupling member attached to said hollow bulbous lower shell, said mounting members extending outwardly from opposite substantially flat side surfaces of said centrally disposed substantially rectilinear base member comprises a key including lower inclined cam surface and upper inclined cam surface that intersect to cooperatively form an apex in combination with a key element having a substantially flat surface substantially parallel to be the substantially flat side surface of the centrally disposed substantially rectilinear base member and the lamp socket of the lamp fixture is obversely configured with respect to said mounting member comprising a centrally disposed substantially rectilinear cavity having a key-way formed on opposite side walls of the centrally disposed substantially rectilinear cavity to receive said centrally disposed substantially rectilinear base member and a corresponding mounting member.

16. The integrated fluorescent lamp of claim 1 wherein said electronic ballast comprises a pair of second electronic ballast inputs and a pair of second electronic ballast outputs mounted on said electronic ballast affixed to opposite end portions of said tube of said fluorescent lamp to selectively feed electricity therebetween.

17. The integrated fluorescent lamp device of claim 1 wherein said electronic ballast includes a fuse.

18. The integrated fluorescent lamp device of claim 1 wherein said enclosure comprises a hollow bulbous lower shell and an upper cap to cooperatively form a cavity to receive and support said electronic ballast therein and said lamp base comprises a centrally disposed base member coupled to the enclosure by a coupling member attached to the hollow bulbous lower shell.

\* \* \* \* \*